(12) United States Patent
Xu et al.

(10) Patent No.: US 12,232,039 B2
(45) Date of Patent: Feb. 18, 2025

(54) SIGNAL TRANSMISSION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Weijie Xu, Guangdong (CN); Jia Shen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 391 days.

(21) Appl. No.: 17/155,955

(22) Filed: Jan. 22, 2021

(65) Prior Publication Data

US 2021/0144646 A1    May 13, 2021

Related U.S. Application Data

(63) Continuation of application No. PCT/CN2018/097192, filed on Jul. 26, 2018.

(51) Int. Cl.
*H04W 52/02* (2009.01)
*H04W 72/23* (2023.01)
*H04W 76/28* (2018.01)

(52) U.S. Cl.
CPC ....... *H04W 52/0235* (2013.01); *H04W 72/23* (2023.01); *H04W 76/28* (2018.02)

(58) Field of Classification Search
CPC ............. H04W 76/28; H04W 52/0235; H04W 72/0453; H04W 72/23; H04W 52/0216; H04W 52/0225; H04W 52/028; H04W 52/0229; H04W 52/0212; H04L 5/001; H04L 5/0098; Y02D 30/70
See application file for complete search history.

(56) References Cited

U.S. PATENT DOCUMENTS

| | | |
|---|---|---|
| 2014/0098785 A1 | 4/2014 | Frenne et al. |
| 2016/0014778 A1 | 1/2016 | Zhou et al. |
| 2018/0183551 A1 | 6/2018 | Chou et al. |
| (Continued) | | |

FOREIGN PATENT DOCUMENTS

| | | | |
|---|---|---|---|
| CN | 107948988 A | 4/2018 | |
| CN | 108012329 A | 5/2018 | |
| (Continued) | | | |

OTHER PUBLICATIONS

The international search report of PCT application No. PCT/CN2018/097192, dated Apr. 28, 2019.
(Continued)

*Primary Examiner* — Quoc Thai N Vu
(74) *Attorney, Agent, or Firm* — Ladas & Parry LLP

(57) ABSTRACT

Embodiments of the present application disclose a signal transmission method, a network device, and a terminal device. The method includes: sending, by a network device, when a terminal device is configured with multiple Bandwidth Parts (BWPs), configuration information of each BWP's corresponding power saving signal of the multiple BWPs to the terminal device. The method, network device, and terminal device of the embodiments of the present application are beneficial to achieve a better power saving gain.

10 Claims, 6 Drawing Sheets

200    If a terminal device is configured with multiple bandwidth part BWPs, a network device sends configuration information of each BWP's corresponding power saving signal of the multiple BWPs to the terminal device  ~ 210

(56) References Cited

U.S. PATENT DOCUMENTS

| | | | |
|---|---|---|---|
| 2019/0312635 A1* | 10/2019 | Ang | ............... H04L 5/0007 |
| 2021/0119742 A1* | 4/2021 | Wu | ............... H04W 72/0453 |
| 2021/0235492 A1* | 7/2021 | Iyer | ............... H04W 72/0453 |
| 2023/0319554 A1 | 10/2023 | Guo et al. | |

FOREIGN PATENT DOCUMENTS

| | | |
|---|---|---|
| CN | 108174450 A | 6/2018 |
| CN | 109417413 A | 3/2019 |
| JP | 2011-259196 A | 12/2011 |
| RU | 2467493 C2 | 11/2012 |
| WO | 2018031327 A1 | 2/2018 |
| WO | 2018059394 A1 | 4/2018 |
| WO | 2018066923 A1 | 4/2018 |
| WO | 2018075828 A1 | 4/2018 |
| WO | 2018085044 A1 | 5/2018 |
| WO | 2018088923 A1 | 5/2018 |
| WO | 2018128855 A1 | 7/2018 |
| WO | 2019160353 A1 | 8/2019 |
| WO | 2020006752 A1 | 1/2020 |

OTHER PUBLICATIONS

The first Office Action of corresponding European application No. 18927619.9, dated Feb. 26, 2023.
The first Office Action of corresponding Chinese application No. 201880037577.6, dated Dec. 26, 2022.
The first Office Action of corresponding Taiwan application No. 108126657, dated Dec. 13, 2022.
The first Office Action of corresponding Japan application No. 2021-504350, dated Jul. 5, 2022, with machine translation provided by Global Dossier.
Vivo, NR UE power saving, R1-1806091, 3GPP TSG RAN WG1 Meeting #93, Busan, Korea, May 21-25, 2018.
Oppo, UE adaptation to the traffic for UE power saving, R1-1810976, 3GPP TSG RAN WG1 Meeting #94bis, Chengdu, China, Oct. 8-12, 2018.
The first Office Action of corresponding Indian application No. 202117005604, dated Jan. 12, 2022.
The first Office Action of corresponding Canadian application No. 310751, dated Jan. 31, 2022.
The first Office Action of corresponding Chinese application No. 201880037577.6, dated Dec. 26, 2022 with machine translation.
The EESR of corresponding European application No. 18927619.9, dated Jun. 28, 2021.
Samsung: "On UE Power Savings", 3GPP Draft; R1-1715883 On UE Power Savings, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017 Sep. 17, 2017(Sep. 17, 2017), XP051339442.
Huawei et al:"Design considerations for UE power saving", 3GPP Draft; R1-1807306, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018 May 20, 2018(May 20, 2018), XP051442501.
The first Office Action of corresponding Russian application No. 2021103091, dated Aug. 27, 2021.
The Notice of Rejection of corresponding Taiwan application No. 108126657, dated Apr. 21, 2023.
The second Office Action of corresponding Chinese application No. 201880037577.6, dated Jun. 15, 2023.
Sony, UE Power Saving in NR, R1-1716649, 3GPP TSG RAN NR AH3, Nagoya, Japan Sep. 18-21, 2017.
The Notice of Allowance of corresponding Chinese application No. 201880037577.6, dated Oct. 7, 2023.
The Office Action of corresponding Taiwan application No. 108126657, dated Dec. 15, 2023.
The first Office Action of corresponding Australian application No. 2018434236, dated Feb. 24, 2024.
The first Office Action of corresponding Korean application No. 10-2021-7004373, dated Apr. 23, 2024.
The Hearing Notice of corresponding Indian application No. 202117005604, dated May 31, 2024.
The second Office Action of corresponding Australian application No. 2018434236, dated Jul. 4, 2024.
The NOA of corresponding Korean application No. 1020217004373, dated Dec. 6, 2024.
Apple Inc. Control Information for UE Power Saving, R1-1717781, 3GPP TSG-RAN WG1 Meeting #90-Bis, Prague, Czech, Oct. 9-13, 2017.
Apple Inc. BWP of Size Zero for UE Power Saving, R1-1720546, 3GPP TSG-RAN WG1 #91, Reno, US, Nov. 27-Dec. 1, 2017

* cited by examiner

SIGNAL TRANSMISSION METHOD, NETWORK DEVICE AND TERMINAL DEVICE

CROSS-REFERENCE TO RELATED APPLICATIONS

This application is a Continuation Application of the PCT Application No. PCT/CN2018/097192, filed on Jul. 26, 2018, the disclosure of which is incorporated herein by reference in its entirety.

TECHNICAL FIELD

Embodiments of the present application relate to the field of communication, and specifically, to a signal transmission method, a network device, and a terminal device.

BACKGROUND

With the evolution of communication systems, higher requirements have been proposed for terminal power saving. For example, for the existing Discontinuous Reception (DRX) mechanism, in each On Duration, a terminal needs to continuously detect Physical Downlink Control Channel (PDCCH) to determine whether a base station schedules data transmission that sends to itself. However, for most terminals, there may be no need to receive data transmission for a long time, but it is still necessary to maintain a regular wake up mechanism to monitor possible downlink transmissions. For such terminals, there is room for further optimization of power saving. The situation is similar to a terminal receiving a paging message in an idle state.

For the DRX mechanism, an indication signal may be sent to the terminal before the On Duration, and the terminal performs PDCCH detection and data reception in the On Duration of the DRX only after the indication signal has been detected; otherwise, the PDCCH detection is not performed. The indication signal is a Wake-up Signal (WUS), and the Wake-up Signal is also called a power saving signal. Similarly, for the terminal receiving the paging message in the idle state, before a Paging Occasion (PO), whether the PDCCH needs to be detected at this PO is determined by detecting the power saving signal.

In a case of introducing Bandwidth Part (BWP), there is currently no clear solution as to how to configure the power saving signal.

SUMMARY

The embodiments of the present application provide a signal transmission method, a network device, and a terminal device, which is beneficial to improve the flexibility of the terminal device to receive a power saving signal, thereby a better power saving gain can be realized.

In a first aspect, a signal transmission method is provided. The method includes: sending, by a network device if a terminal device is configured with multiple Bandwidth Parts (BWPs), configuration information of each BWP's corresponding power saving signal of the multiple BWPs to the terminal device.

In a second aspect, a signal transmission method is provided. The method includes: receiving, by a terminal device if the terminal device is configured with multiple Bandwidth Parts (BWPs), configuration information of each BWP's corresponding power saving signal of the multiple BWPs sent by a network device.

In a third aspect, a network device is provided for performing methods in the first aspect or various implementations thereof described above.

Specifically, the network device includes function modules for performing the methods in the first aspect or various implementations thereof described above.

In a fourth aspect, a terminal device is provided for performing methods in the second aspect or various implementations thereof described above.

Specifically, the terminal device includes function modules for performing the methods in the second aspect or various implementations thereof described above.

In a fifth aspect, a network device is provided, including a processor and a memory. The memory is configured to store a computer program, and the processor is configured to invoke and run the computer program stored in the memory, and execute methods in the first aspect or various implementations thereof described above.

According to a sixth aspect, a terminal device is provided, including a processor and a memory. The memory is configured to store a computer program, and the processor is configured to invoke and run the computer program stored in the memory to execute methods in the second aspect or various implementations thereof described above.

In a seventh aspect, a chip is provided for implementing methods in any one of the first aspect to the second aspect or various implementations thereof described above.

Specifically, the chip includes a processor for invoking and running a computer program from a memory, so that a device installed with the chip executes methods in any one of the first aspect to the second aspect or various implementations thereof described above.

In an eighth aspect, a computer-readable storage medium is provided for storing a computer program, the computer program causes a computer to execute methods in any one of the first aspect to the second aspect or various implementations thereof described above.

In a ninth aspect, a computer program product is provided, including a computer program instruction, the computer program instruction causes a computer to execute methods in any one of the first aspect to the second aspect or various implementations thereof described above.

In a tenth aspect, a computer program is provided that, when run on a computer, causes the computer to execute methods in any one of the first aspect to the second aspect or various implementations thereof described above.

Through the above technical solutions, by individually configuring power saving signals for multiple BWPs, it is beneficial to improve the flexibility of the terminal device to receive power saving signals, and thus better power saving gain can be achieved.

DESCRIPTION OF EMBODIMENTS

The technical solutions in the embodiments of the present application will be described below in combination with the drawings in the embodiments of the present application. Obviously, the described embodiments are part of the embodiments of the present application, but not all of the embodiments. Based on the embodiments in the present application, all other embodiments obtained by a person of ordinary skill in the art without creative efforts shall fall within the protection scope of the present application.

The technical solutions in the embodiments of the present application can be applied to various communication systems, for example, a Global System of Mobile Communication (GSM) system, a Code Division Multiple Access (CDMA) system, and a Wideband Code Division Multiple Access (WCDMA) system, a General Packet Radio Service (GPRS) system, an LTE system, an LTE Frequency Division Duplex (FDD) system, a long term evolution (LTE) Time Division Duplex (TDD) system, a Universal Mobile Telecommunication System (UMTS), a Worldwide Interoperability for Microwave Access (WiMAX) communication system or a 5G system, and the like.

Figure 1:
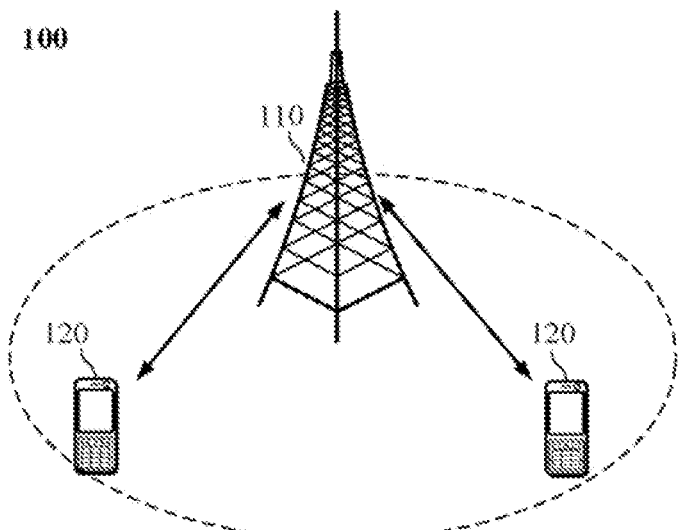
FIG. 1 is a schematic diagram of a communication system architecture according to an embodiment of the present application.

Exemplarily, a communication system 100 applied in an embodiment of the present application is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with terminal devices located within the coverage area. The network device 110 may be a base transceiver station (BTS) in a GSM system or a CDMA system, or a base station (NodeB, NB) in a WCDMA system, or an evolved Node B (eNB, or eNodeB) in an LTE system, or a wireless controller in a Cloud Radio Access Network (C-RAN). Or the network device may be a mobile switching center, a relay station, an access point, an in-vehicle device, a wearable device, a hub, a switch, a bridge, a router, a network-side device in a 5G network, or a network device in a future evolved Public Land Mobile Network (PLMN).

The communication system 100 further includes at least one terminal device 120 located within a coverage area of the network device 110. As a "terminal device" used herein, it may include but is not limited to a User Equipment (UE), an access terminal, a user unit, a user station, a mobile station, a mobile platform, a remote station, a remote terminal, a mobile device, a user terminal, a terminal, a wireless communication device, a user agent or a user apparatus. The access terminal may be a cell phone, a cordless phone, a Session Initiation Protocol (SIP) phone, a Wireless Local Loop (WLL) station, a Personal Digital Assistant (PDA), and a handheld devices with wireless communication function, a computing device or other processing devices connected to wireless modems, an in-vehicle device, a wearable device, a terminal device in a future 5G network or a terminal device in a future evolved Public Land Mobile Network (PLMN) and the like, which is not limited in the embodiments of the present disclosure.

In an embodiment, device to device (D2D) communication may be performed between the terminal devices 120.

In an embodiment, the 5G system or the 5G network may also be referred to as a New Radio (NR) system or an NR network.

FIG. 1 exemplarily shows one network device and two terminal devices. In an embodiment, the communication system 100 may include multiple network devices and other numbers of terminal devices may be included within the coverage of each network device, the embodiment of the present application does not limit thereto.

In an embodiment, the communication system 100 may further include other network entities such as a network controller, a mobility management entity, the embodiment of the present application does not limit thereto.

It should be understood that the device having a communication function in the network/system in the embodiments of the present application may be referred to as a communication device. Taking the communication system 100 shown in FIG. 1 as an example, the communication device may include the network device 110 and the terminal device 120 having the communication function, and the network device 110 and the terminal device 120 may be specific devices described above, and details are not described herein again. The communication device may also include other devices in the communication system 100, for example, other network entities such as the network controller, the mobile management entity, which is not limited in the embodiments of the present application.

It should be understood that the terms "system" and "network" are often used interchangeably herein. The term "and/or" herein is only a kind of association relationship describing associated objects, which means that there can be three kinds of relationships, for example, A and/or B can mean: A exists alone, A and B exist simultaneously, and B exists alone these three cases. In addition, the character "/" herein generally indicates that the associated objects front and back are an "or" relationship.

In order to reduce power consumption of the terminal, both the LTE and NR systems have a DRX mechanism, so that the terminal does not have to turn on a receiver all the time when there is no data reception, but enters a discontinuous reception state, thereby achieving a purpose of power saving. The DRX mechanism includes configuring a DRX cycle for a UE in a connected state. A DRX cycle consists of an "On Duration" and an "Opportunity for DRX". During the "On Duration" Lime, the UE monitors and receives downlink channels and signals including the PDCCH; during the "Opportunity for DRX" time, the UE does not receive downlink channels and signals such as the PDCCH to reduce power consumption. The UE in an idle state needs to receive a paging message in a similar manner as DRX. During a DRX cycle, there is a Paging Occasion (PO). The UE only receives the paging message at the PO, and does not receive the paging message at the time outside the PO to achieve the purpose of power saving. During the PO, the UE determines whether there is a paging message by detecting a PDCCH signal scrambled through a Paging Radio Network Temporary Identifier (P-RNTI).

In 5G and LTE evolution projects, an enhancement mechanism of DRX is currently being discussed. For example, although a network has configured the DRX mechanism for the UE, the UE is only scheduled opportunistically at the On Duration that appears periodically, even when the service load is very low, the UE is only scheduled within a few DRX cycles; for the paging message that use the DRX mechanism, the UE has fewer opportunities to receive the paging message. Therefore, after the UE is configured with the DRX mechanism, there are still most PDCCH detections within the On Duration that have not detected data scheduling, which leaves room for further optimization.

Similarly, for paging, the UE will only obtain paging on some POs for a long time, and on most POs, the UE detects that there is no corresponding paging message for the PDCCH that schedules the UE, so the reception of the terminal paging message under the existing mechanism has unnecessary consumption of power, and there is also a possibility of optimization.

Further, for the PDCCH reception of the UE in the connected state or the PDCCH reception during the On Duration, there are similar problems described above. This is because that there are multiple users in a system, when the system load is high, a single user will only obtain PDCCH schedule in part of time, similarly, the service arrival of the UE is uncertain in time, and the network will schedule the UE only after the service of the UE arrives. Therefore, for the PDCCH reception of the UE in the connected state or the PDCCH reception during the On Duration, there is also an optimization possibility similar to the foregoing.

Currently, for the DRX mechanism, an optimized solution is that if a base station determines that the terminal needs to be scheduled during the On Duration, an indication signal can be sent to the terminal before the On Duration, otherwise the indicator signal is not sent to the terminal. The terminal performs PDCCH detection and data reception during the On Duration of DRX only after detecting the indication signal, otherwise, it does not perform PDCCH detection. The above indication signal is beneficial to the power saving of the terminal, and we can also call it WUS. At this time, the UE only needs to detect a power saving signal to determine whether the PDCCH needs to be detected during this On Duration, which can save power compared to directly detecting the PDCCH. Similarly, for the UE in the idle state receiving the paging message, it is determined whether the PDCCH needs to be detected at this PO by detecting the power saving signal before the PO.

The concept of BWP is introduced in NR. A BWP may include a set of continuous physical resource blocks (PRB), and the bandwidth of the BWP is less than or equal to a carrier bandwidth. For a serving cell of a terminal, a maximum of 4 BWPs can be configured, one of which is a default BWP and the default BWP may be an initial active downlink (DL) BWP or may be a BWP different from the initial active DL BWP. However, the terminal currently can only have one activated BWP. The terminal can switch among multiple BWPs based on downlink control information (DCI) signaling sent by the network, and can also switch among the multiple BWPs based on control of a timer.

The embodiment of the present application provides a method for how to configure power saving signal when a terminal is configured with multiple BWPs.

Figure 2:
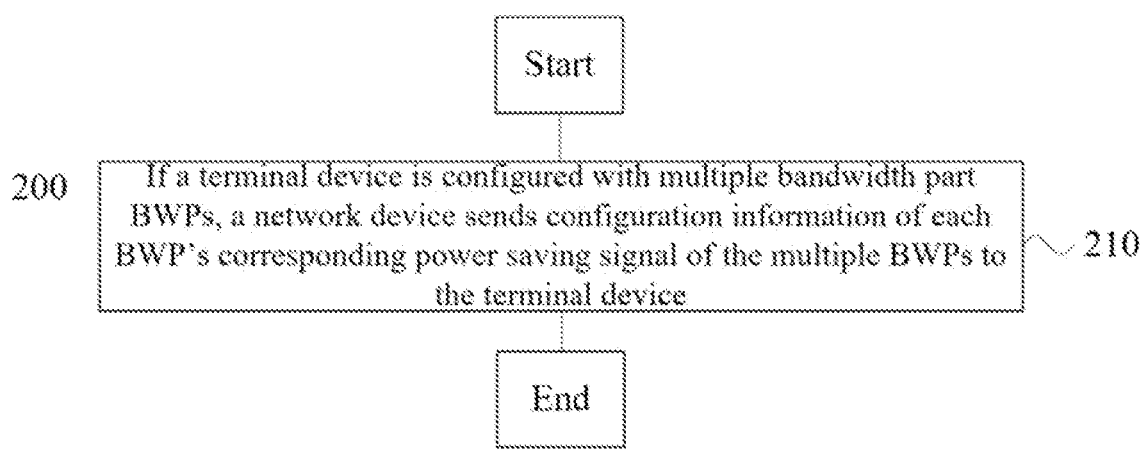
FIG. 2 is a schematic block diagram of a signal transmission method according to an embodiment of the present application.

FIG. 2 is a schematic flowchart of a signal transmission method 200 according to an embodiment of the present application. As shown in FIG. 2, the method 200 includes part or all of the following:

S210, if a terminal device is configured with multiple Bandwidth Parts (BWPs), a network device sends configuration information of each BWP's corresponding power saving signal of the multiple BWPs to the terminal device.

When the terminal device is configured with the multiple BWPs, configuration of the power saving signal by a network may be per-BWP configuration, that is, the network separately configures a corresponding power saving signal for each BWP. For example, frequency domain resource positions and/or time domain resource positions of the power saving signal can be configured, or the number of times that the power saving signal is sent can also be configured, or a numerology of the power saving signal can be configured, such as a subcarrier interval. In this way, when a certain BWP is in an activated state, the terminal device can acquire configuration information of its corresponding power saving signal. Thereby, a better power saving gain can be achieved.

It should be noted that the configuration information of the each BWP's corresponding power saving signal may also be appointed by the protocol. For example, the protocol may appoint multiple BWPs, and specifically may appoint bandwidth ranges of the multiple BWPs. The protocol may further appoint the frequency domain resource positions and/or the time domain resource positions of the each BWP's corresponding power saving signal, and which are configured inside the terminal device. The network device can acquire the configuration information of the each BWP's corresponding power saving signal in advance. When a certain BWP is in the activated state, and the network device needs to send the power saving signal, the network device can determine configuration information of the activated BWP's corresponding power saving signal, and then the network device sends the power saving signal according to the acquired configuration information. For example, the power saving signal is sent on the configuration information.

In an embodiment, when the network device sends the configuration information of the each BWP's corresponding power saving signal to the terminal device, the configuration information of the power saving signal may be included in configuration information of its corresponding BWP. That is, the network device sends configuration information of each BWP to the terminal device, and also configures the power saving signal of the corresponding BWP, and carries the configuration information of the power saving signal of the corresponding BWP in the configuration information of the BWP. For example, the configuration information of the BWP may include a bandwidth range of the BWP, a numerology, and measurement-related parameters (radio resource management (RRM) measurement or radio link monitoring (RLM) measurement), and the like. The configuration information of the BWP may also include time-frequency resource positions of the corresponding power saving signal and the like. Therefore, the network device can accomplish both configuration of the BWP and configuration of the corresponding power saving signal through a single signaling, which saves signaling overhead.

In an embodiment, frequency domain resources of the each BWP's corresponding power saving signal are located inside a bandwidth range of its corresponding BWP, or, frequency domain resources of the each BWP's corresponding power saving signal are located outside the bandwidth range of its corresponding BWP, or, the multiple BWPs are divided into a first BWP set and a second BWP set, and frequency domain resources of each BWP's corresponding power saving signal in the first BWP set are located inside a bandwidth range of its corresponding BWP, and frequency domain resources of the each BWP's corresponding power saving signal in the second BWP set are located outside a bandwidth range of its corresponding BWP.

The first embodiment to the third embodiment of the present application will be described in detail below in combination with FIGS. 3 to 5.

Assuming that the network configures three BWPs to the terminal, BWP1, BWP2, and BWP3, respectively. The power saving signals configured by the network for the three BWPs are respectively shown in FIGS. 3 to 5.

Figure 3:
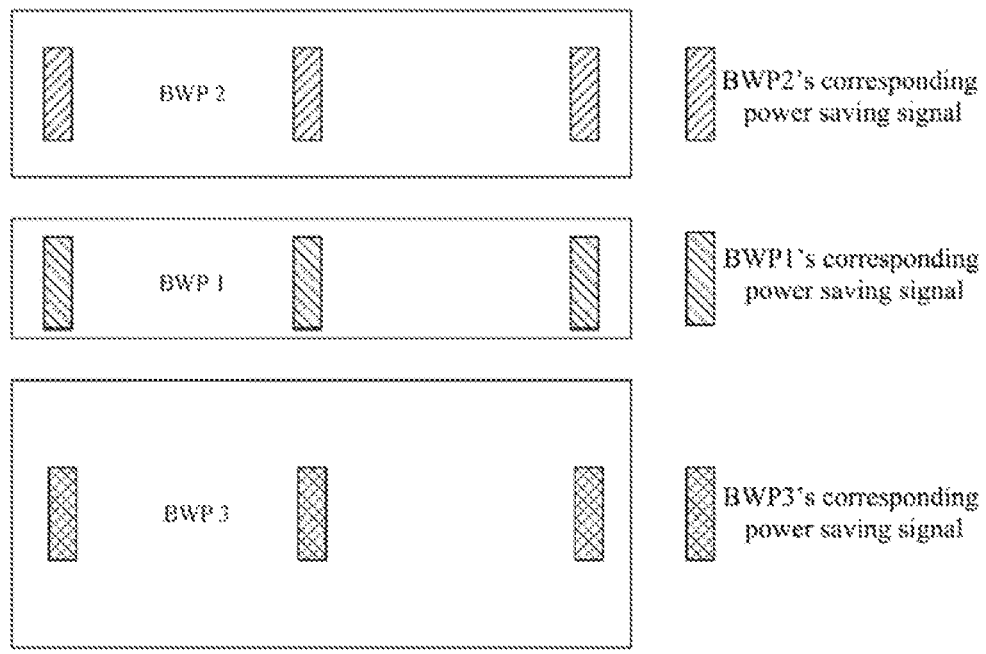
FIG. 3 is a schematic diagram of power saving signals and BWPs on frequency domains according to an embodiment of the present application.

In FIG. 3, the frequency domain resources of the each BWP's corresponding power saving signal are located inside the bandwidth range of its corresponding BWP. Specifically, BWP1's corresponding power saving signal is located in BWP1 on frequency domain. BWP2's corresponding power saving signal is located in BWP2 on frequency domain, and BWP3's corresponding power saving signal is located in BWP3 on frequency domain.

That is, when a certain BWP is activated, the network device can send a corresponding power saving signal to the terminal device on this BWP, and the terminal device can receive the corresponding power saving signal sent by the network device on this BWP, avoiding unnecessary frequency hopping when receiving the power saving signal.

Figure 4:
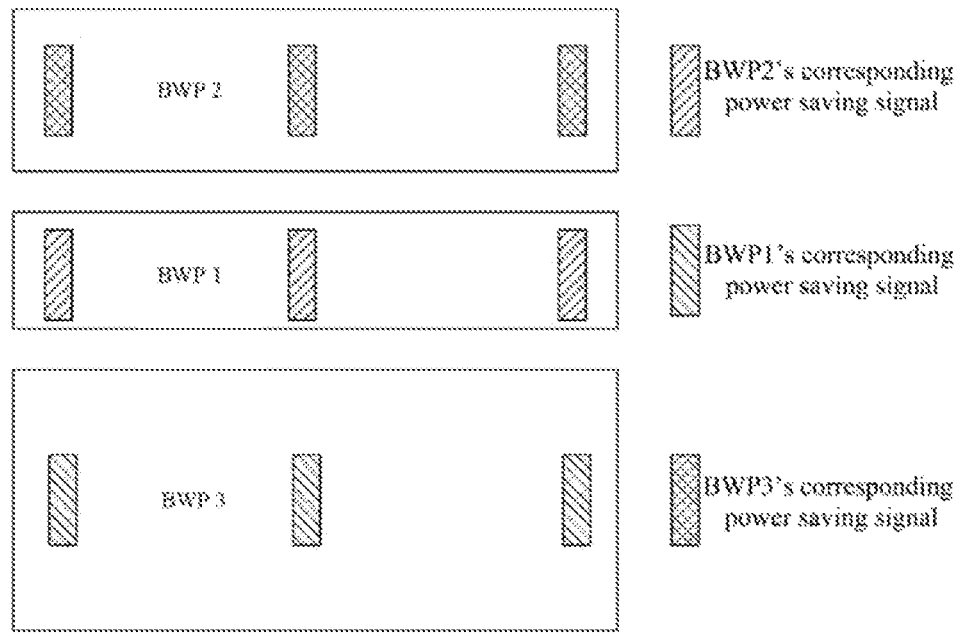
FIG. 4 is another schematic diagram of power saving signals and BWPs on frequency domains according to an embodiment of the present application.

In FIG. 4, the frequency domain resources of the each BWP's corresponding power saving signal are outside the bandwidth range of the corresponding BWP. Specifically, the BWP1's corresponding power saving signal is located in BWP3 on frequency domain, the BWP2's corresponding power saving signal corresponding to BWP2 is located in BWP1 on frequency domain, and the BWP3's corresponding power saving signal is located in BWP2 on frequency domain.

Figure 5:
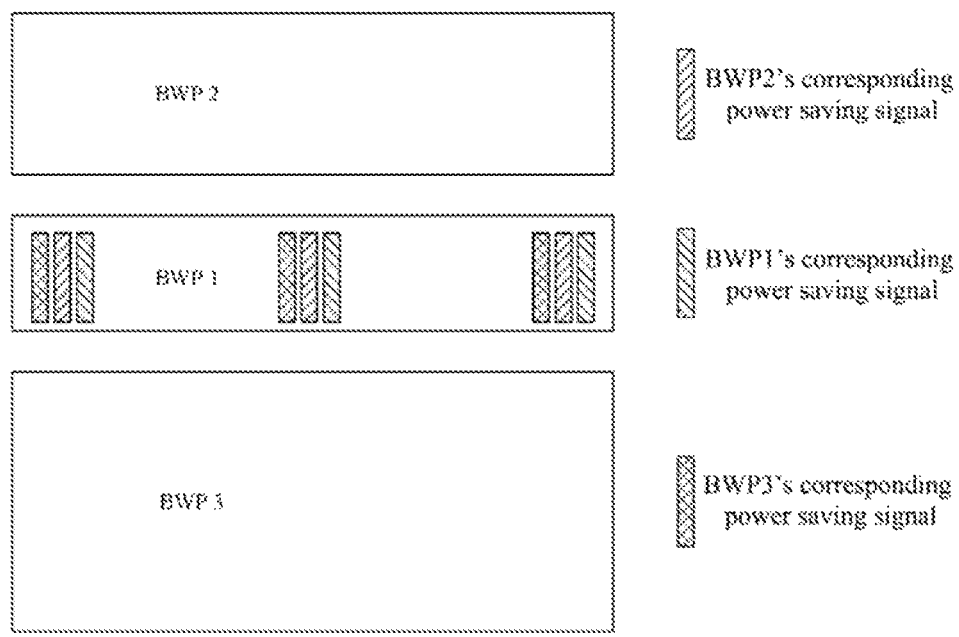
FIG. 5 is yet another schematic diagram of power saving signals and BWPs on the frequency domains according to the embodiment of the present application.

In FIG. 5, among the multiple BWPs, frequency domain resources of some BWPs' corresponding power saving signals are located inside bandwidth ranges of their corresponding BWPs, and frequency domain resources of other BWPs' corresponding power saving signals are located outside bandwidth ranges of their corresponding BWPs. For example, the frequency domain resources of the multiple BWPs' corresponding power saving signals may be located inside a bandwidth range of the same BWP. Specifically, the power saving signals respectively corresponding to BWP1, BWP2, and BWP3 are all located in BWP1 on frequency domain. In other words, the power saving signals respectively corresponding to BWP2 and BWP3 are located in a BWP outside bandwidth ranges respective occupied on frequency domains, and the power saving signal corresponding to BWP1 is located inside a bandwidth range of itself on frequency domains.

The frequency domain resources of the multiple BWPs' corresponding power saving signals may also be located inside bandwidth ranges of some BWPs. For example, if the terminal is configured with 4 BWPs, BWP1, BWP2, BWP3, and BWP4, the frequency domain resources of the each BWP's corresponding power saving signal may be located inside bandwidth ranges of BWP1 and BWP2, for example, the frequency domain resources of the power saving signals corresponding to BWP1-BWP4 are all located in BWP1 and BWP2. FIG. 5 is only for illustration and is not intended to be limiting.

In an embodiment, when the frequency domain resources of the power saving signals respectively corresponding to the multiple BWPs configured to the terminal device are located inside the bandwidth range of the same BWP, the BWP may be a default BWP or an initial active downlink BWP.

In an embodiment, the following attributes of the power saving signals respectively corresponding to the multiple BWPs may be all the same or different, or may be partly the same, and other parts may be different. This attribute can be a bandwidth of the power saving signal, that is, the frequency domain width of the power saving signal. For example, some BWPs' corresponding power saving signals can use a relatively large signal bandwidth, and some BWPs' corresponding power saving signals can use a smaller signal bandwidth. This attribute can also be a sequence type used by the power saving signal. For example, some BWPs' corresponding power saving signals can use Zadoff Chu (ZC) sequence, and some BWPs' corresponding power saving signals can use pseudo-random sequence. This attribute can also be a sequence number of the power saving signal. For example, assuming that the power saving signal uses the ZC sequence, different BWPs can use different ZC sequence cyclic shifts, and different ZC sequence cyclic shifts can correspond to different sequence numbers, that is, having different sequence numbers.

It should be understood that the power saving signal in the embodiments of the present application is essentially an indication signal, which may be the aforementioned WUS, or may be some other signals, for example, it may reuse existing synchronization signal/physical broadcast channel (SS/PBCH) blocks, a PDCCH channel itself, or a channel or signal of a candidate resource that occupies the PDCCH, that is, as long as the terminal device receives or does not receive these SS/PBCH blocks or the PDCCH channel itself or the channel or signal of the candidate resource that occupies the PDCCH, it can be determined that detection of the PDCCH in a corresponding receiving window is not performed. The network device and the terminal device can agree on these rules in advance. The embodiments of the present application does not limit the specific expression manner of the power saving signal.

For example, for the terminal in an idle state, the power saving signal may be a wake up signal, the wake up signal is used to wake up the terminal, and a timing relationship between the wake up signal and the PO may be configured by the network device.

After the network device sends the configuration information of the multiple BWPs' corresponding power saving signals to the terminal device, when the power saving signal needs to be sent, configuration information of a currently activated BWP's corresponding power saving signal can first be acquired, and then the currently activated BWP's corresponding power saving signal can be sent to the terminal device according to the configuration information.

For the network device, a power saving signal sent on a time-frequency resource of one power saving signal may be directed to at least one sending window on the currently activated BWP, and the sending window may be a sending window of DRX, that is, the above-mentioned "On Duration", the sending window may also be a Paging Occasion (PO), or a monitoring window of the PDCCH, that is, a PDCCH search space, and the like. For the terminal device, a power saving signal received on the time-frequency resource of one power saving signal may be directed to at least one receiving window on a currently activated BWP, and the receiving window may be a sending window of DRX, a Paging Occasion, or a PDCCH search space, and the like. Once the terminal device receives the power saving signal, it can perform detection of the PDCCH in a corresponding receiving window. If not received, the terminal device does not perform the detection of the PDCCH in the corresponding receiving window.

It should be understood that the power saving signal may also be used to indicate to the terminal device that detection of the PDCCH is not performed in a corresponding receiving window. That is, once the terminal device receives the power saving signal, it does not perform the detection of the PDCCH in the corresponding receiving window. If not received, the terminal device performs the detection of the PDCCH in the corresponding receiving window.

The sending window or receiving window corresponding to a power saving signal involved here may be a first sending window or a first receiving window after the power saving signal, or other subsequent sending window or receiving window, or may be subsequent multiple sending windows or receiving windows, the embodiments of the present application does not limit thereto.

After the BWP switching, the network device sends the power saving signal to the terminal device on a configuration resource of the power saving signal corresponding to the BWP after the switching. Similarly, the terminal device receives the power saving signal on the configuration resource of the power saving signal corresponding to the BWP after the switching.

Figure 6:
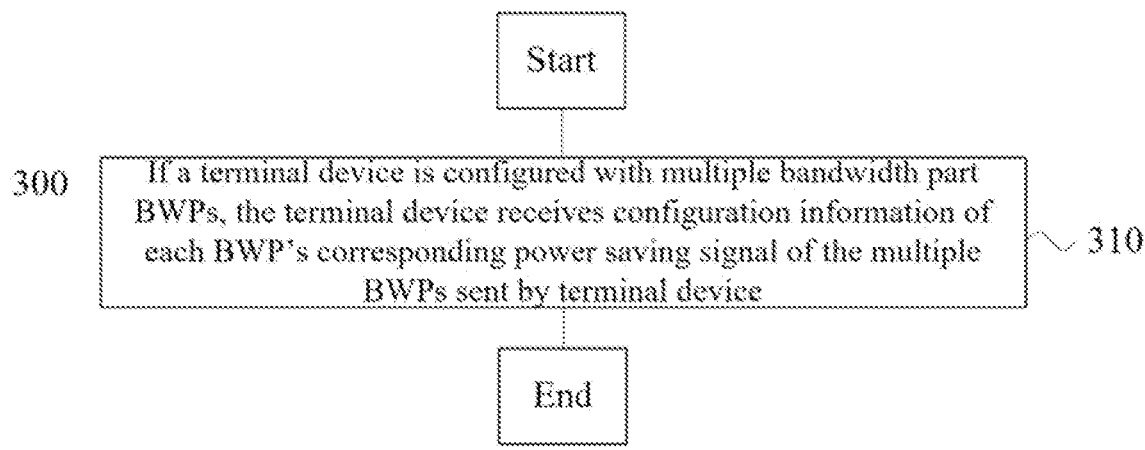
FIG. 6 is another schematic block diagram of a signal transmission method according to an embodiment of the present application.

FIG. 6 is a schematic block diagram of a signal transmission method 300 according to an embodiment of the present application. As shown in FIG. 6, the method 300 includes some or all of the following:

S310, if a terminal device is configured with multiple Bandwidth Parts (BWPs), the terminal device receives configuration information of each BWP's corresponding power saving signal of the multiple BWPs sent by a network device.

Therefore, the signal transmission method of the embodiment of the present application, by individually configuring power saving signals for the multiple BWPs, it is beneficial to improve the flexibility of the terminal device to receive the power saving signals, thereby a better power saving gain can be achieved.

In an embodiment of the present application, the configuration information of the each BWP's corresponding power saving signal is carried in configuration information of its corresponding BWP.

In an embodiment of the present application, frequency domain resources of the each BWP's corresponding power saving signal are located inside a bandwidth range of its corresponding BWP, or, frequency domain resources of the each BWP's corresponding power saving signal are located outside the bandwidth range of its corresponding BWP.

In an embodiment of the present application, the multiple BWPs are divided into a first BWP set and a second BWP set, and frequency domain resources of each BWP's corresponding power saving signal in the first BWP set are located inside a bandwidth range of its corresponding BWP, and frequency domain resources of each BWP's corresponding power saving signal in the second BWP set are located outside the bandwidth range of its corresponding BWP.

In an embodiment of the present application, the first BWP set includes a first BWP, and the frequency domain resources of the each BWP's corresponding power saving signal in the second BWP set are located inside a bandwidth range of the first BWP.

In an embodiment of the present application, the first BWP is a default BWP or an initial active downlink BWP of the terminal device.

In an embodiment of the present application, at least two BWPs' respective power saving signals of the multiple BWPs are different in terms of at least one attribute of the following attributes: bandwidth of the power saving signal, sequence type used by the power saving signal, and sequence number of the power saving signal.

In an embodiment of the present application, the method further includes: receiving, by the terminal device if a second BWP of the multiple BWPs is in an activated state, the second BWP's corresponding power saving signal sent by the network device according to configuration information of the second BWP's corresponding power saving signal.

In an embodiment of the present application, the method further includes: determining, by the terminal device, that Physical Downlink Control Channel (PDCCH) detection is performed in at least one window on the second BWP according to the second BWP's corresponding power saving signal, or determining, by the terminal device, that Physical Downlink Control Channel (PDCCH) detection is not performed in at least one window on the second BWP according to the second BWP's corresponding power saving signal.

In an embodiment of the present application, the at least one window includes a Discontinuous Reception (DRX) sending window, a Paging Occasion (PO), or a PDCCH search space.

It should be understood that the interaction and relevant characteristics and functions between the terminal device and the network device described by the terminal device correspond to the relevant characteristics and functions of the network device. In other words, what message does the network device send to the terminal device, and the terminal device receives the corresponding message from the network device.

It should also be understood that, in various embodiments of the present application, the order of the sequence numbers of the above processes does not mean an order of an execution sequence, and the execution sequence of each process should be determined by its function and internal logic, and should not constitute any limitation to the implementation of the embodiments of the present application.

The methods for transmitting signals according to the embodiments of the present application have been described in detail above. An apparatus for transmitting signals according to the embodiments of the present application will be described below in combination with FIGS. 7 to 10. The technical features described in the method embodiments are applicable to the following apparatus embodiments.

Figure 7:
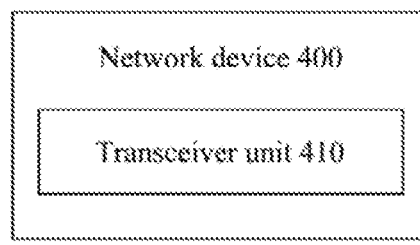
FIG. 7 is a schematic block diagram of a network device according to an embodiment of the present application.

FIG. 7 shows a schematic block diagram of a network device 400 according to an embodiment of the present application. As shown in FIG. 7, the network device 400 includes:

a transceiver unit 410, is configured to send, if a terminal device is configured with multiple Bandwidth Parts (BWPs), configuration information of each BWP's corresponding power saving signal of the multiple BWPs to the terminal device.

In an embodiment of the present application, the configuration information of the each BWP's corresponding power saving signal is carried in configuration information of its corresponding BWP.

In an embodiment of the present application, frequency domain resources of the each BWP's corresponding power saving signal are located inside a bandwidth range of its corresponding BWP, or, frequency domain resources of the each BWP's corresponding power saving signal are located outside the bandwidth range of its corresponding BWP.

In an embodiment of the present application, the multiple BWPs are divided into a first BWP set and a second BWP set, and frequency domain resources of each BWP's corresponding power saving signal in the first BWP set are located inside a bandwidth range of its corresponding BWP, and frequency domain resources of each BWP's corresponding power saving signal in the second BWP set are located outside the bandwidth range of its corresponding BWP.

In an embodiment of the present application, the first BWP set includes a first BWP and the frequency domain resources of the each BWP's corresponding power saving signal in the second BWP set are located inside a bandwidth range of the first BWP.

In an embodiment of the present application, the first BWP is a default BWP or an initial active downlink BWP of the terminal device.

In an embodiment of the present application, at least two BWPs' respective power saving signals of the multiple BWPs are different in terms of at least one attribute of the following attributes: bandwidth of the power saving signal, sequence type used by the power saving signal, and sequence number of the power saving signal.

In an embodiment of the present application, the transceiver unit is further configured to: send, if a second BWP of the multiple BWPs is in an activated state, the second BWP's corresponding power saving signal to the terminal device according to the configuration information of the second BWP's corresponding power saving signal.

In an embodiment of the present application, the second BWP's corresponding power saving signal corresponds to at least one window on the second BWP, and the at least one window comprises a Discontinuous Reception (DRX) sending window, a Paging Occasion (PO) or a Physical Downlink Control Channel (PDCCH) search space.

It should be understood that the network device 400 according to the embodiment of the present application may correspond to the network device in the method embodiments of the present application, and the above and other operations and/or functions of each unit in the network device 400 are respectively to implement the corresponding processes of the network device in the method in FIG. 2. For brevity, details are not described here again.

Figure 8:
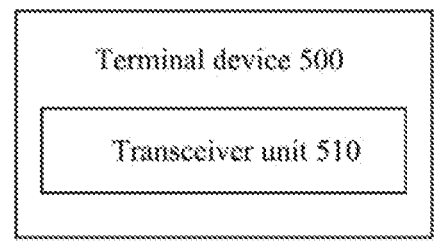
FIG. 8 is a schematic block diagram of a terminal device according to an embodiment of the present application.

FIG. 8 shows a schematic block diagram of a terminal device 500 according to an embodiment of the present application. As shown in FIG. 8, the terminal device 500 includes:

a transceiver unit 510, is configured to receive, if the terminal device is configured with multiple Bandwidth Parts (BWPs), configuration information of each BWP's corresponding power saving signal of the multiple BWPs sent by a network device.

In an embodiment of the present application, the configuration information of the each BWP's corresponding power saving signal is carried in configuration information of its corresponding BWP.

In an embodiment of the present application, frequency domain resources of the each BWP's corresponding power saving signal are located inside a bandwidth range of its corresponding BWP, or, frequency domain resources of the each BWP's corresponding power saving signal are located outside the bandwidth range of its corresponding BWP.

In an embodiment of the present application, the multiple BWPs are divided into a first BWP set and a second BWP set, and frequency domain resources of each BWP's corresponding power saving signal in the first BWP set are located inside a bandwidth range of its corresponding BWP, and frequency domain resources of each BWP's corresponding power saving signal in the second BWP set are located outside a bandwidth range of its corresponding BWP.

In an embodiment of the present application, the first BWP set includes a first BWP, and the frequency domain resources of the each BWP's corresponding power saving signal in the second BWP set are located inside a bandwidth range of the first BWP.

In an embodiment of the present application, the first BWP is a default BWP or an initial active downlink BWP of the terminal device.

In an embodiment of the present application, at least two BWPs' respective power saving signals of the multiple BWPs are different in terms of at least one attribute of the following attributes: bandwidth of the power saving signal, sequence type used by the power saving signal, and sequence number of the power saving signal.

In an embodiment of the present application, the transceiver unit is further configured to: receive, if a second BWP of the multiple BWPs is in an activated state, the second BWP's corresponding power saving signal sent by the network device according to the configuration information of the second BWP's corresponding power saving signal.

In an embodiment of the present application, the terminal device further includes: a processing unit, configured to determine that Physical Downlink Control Channel (PDCCH) detection is performed in at least one window on the second BWP according to the second BWP's corresponding power saving signal, or determine that Physical Downlink Control Channel (PDCCH) detection is not performed in at least one window on the second BWP according to the second BWP's corresponding power saving signal.

In an embodiment of the present application, the at least one window includes a Discontinuous Reception (DRX) sending window, a Paging Occasion (PO), or a PDCCH search space.

It should be understood that the terminal device 500 according to the embodiment of the present application may correspond to the terminal device in the method embodiments of the present application, and the above and other operations and/or functions of each unit in the terminal device 500 are respectively to implement the corresponding processes of the terminal device in the method in FIG. 6. For brevity, details are not described here again.

Figure 9:
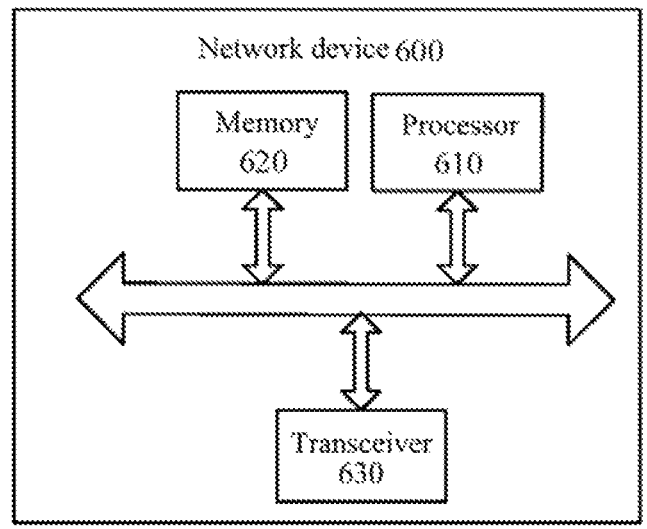
FIG. 9 is another schematic block diagram of a network device according to an embodiment of the present application.

As shown in FIG. 9, an embodiment of the present application further provides a network device 600. The network device 600 may be the network device 400 in FIG. 7, which can be used to perform content of the network device corresponding to the method 200 in FIG. 2. The network device 600 shown in FIG. 9 includes a processor 610, and the processor 610 can invoke and run a computer program from a memory to implement the methods in the embodiments of the present application.

In an embodiment, as shown in FIG. 9, the network device 600 may further include a memory 620. The processor 610 may invoke and run a computer program from the memory 620 to implement the methods in the embodiments of the present application.

The memory 620 may be a separate device independent of the processor 610, or may be integrated in the processor 610.

In an embodiment, as shown in FIG. 9, the network device 600 may further include a transceiver 630, and the processor 610 may control the transceiver 630 to communicate with other devices, and specifically, may send information or data to other devices, or receive information or data sent by other devices.

The transceiver 630 may include a transmitter and a receiver. The transceiver 630 may further include antennas, and the number of the antennas may be one or more.

In an embodiment, the network device 600 may be the network device in the embodiments of the present application, and the network device 600 may implement the corresponding processes implemented by the network device in various methods in the embodiments of the present application. For brevity, details are not described herein again.

In a specific implementation, the transceiver unit in the network device 400 may be implemented by the transceiver 630 in FIG. 9.

Figure 10:
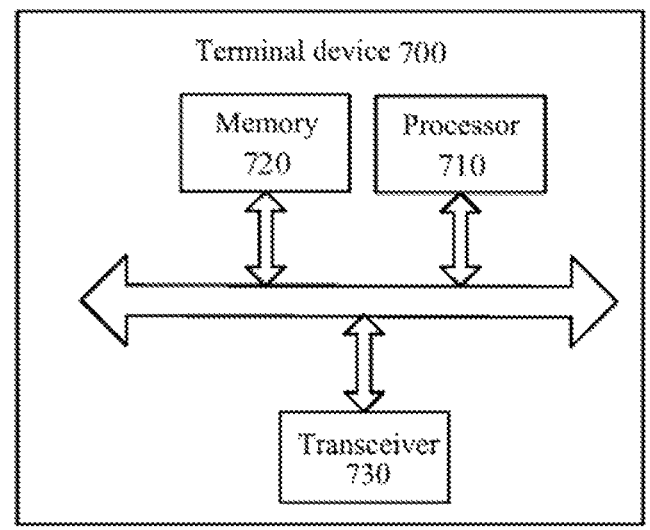
FIG. 10 is another schematic block diagram of a terminal device according to an embodiment of the present application.

As shown in FIG. 10, an embodiment of the present application further provides a terminal device 700. The terminal device 700 may be the terminal device 500 in FIG. 8 and can be used to perform content of the terminal device corresponding to the method 300 in FIG. 6. The terminal device 700 shown in FIG. 10 includes a processor 710. The processor 710 can invoke and run a computer program from a memory to implement the methods in the embodiments of the present application.

In an embodiment, as shown in FIG. 10, the terminal device 700 may further include a memory 720. The processor 710 may invoke and run a computer program from the memory 720 to implement the methods in the embodiments of the present application.

The memory 720 may be a separate device independent of the processor 710, or may be integrated in the processor 710.

In an embodiment, as shown in FIG. 10, the terminal device 700 may further include a transceiver 730, and the processor 710 may control the transceiver 730 to communicate with other devices, and specifically, may send information or data to other devices, or receive information or data sent by other devices.

The transceiver 730 may include a transmitter and a receiver. The transceiver 730 may further include antennas, and the number of the antennas may be one or more.

In an embodiment, the terminal device 700 may be the terminal device in the embodiments of the present application, and the terminal device 700 may implement the corresponding processes implemented by the terminal device in various methods in the embodiments of the present application. For brevity, details are not described herein again.

In a specific implementation, the processing unit in the terminal device 50) may be implemented by the processor 710 in FIG. 10. The transceiver unit 510 in the terminal device 500 may be implemented by the transceiver 730 in FIG. 10.

Figure 11:
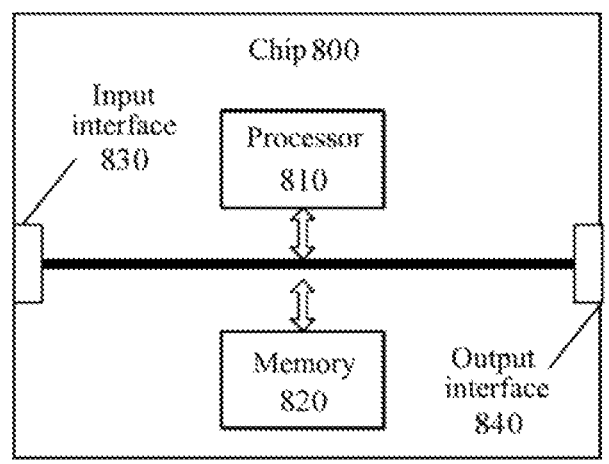
FIG. 11 is a schematic block diagram of a chip according to an embodiment of the present application.

FIG. 11 is a schematic structural diagram of a chip according to an embodiment of the present application. The chip 800 shown in FIG. 11 includes a processor 810, and the processor 810 can invoke and run a computer program from a memory to implement the methods in the embodiments of the present application.

In an embodiment, as shown in FIG. 11, the chip 800 may further include a memory 820. The processor 810 may invoke and run a computer program from the memory 820 to implement the methods in the embodiments of the present application.

The memory 820 may be a separate device independent of the processor 810, or may be integrated in the processor 810.

In an embodiment, the chip 800 may further include an input interface 830. The processor 810 may control the input interface 830 to communicate with other devices or chips, specifically, information or data sent by other devices or chips may be acquired.

In an embodiment, the chip 800 may further include an output interface 840. The processor 810 may control the output interface 840 to communicate with other devices or chips, specifically, information or data to other devices or chips may be output.

In an embodiment, the chip may be applied to the network device in the embodiments of the present application, and the chip may implement the corresponding processes implemented by the network device in various methods in the embodiments of the present application. For brevity, details are not described herein.

In an embodiment, the chip may be applied to the terminal device in the embodiments of the present application, and the chip may implement the corresponding processes implemented by the terminal device in various methods in the embodiments of the present application. For brevity, details are not described herein again.

It should be understood that the chip mentioned in the embodiments of the present application may also be referred as a system-level chip, a system chip, a chip system or a system-on-chip.

Figure 12:
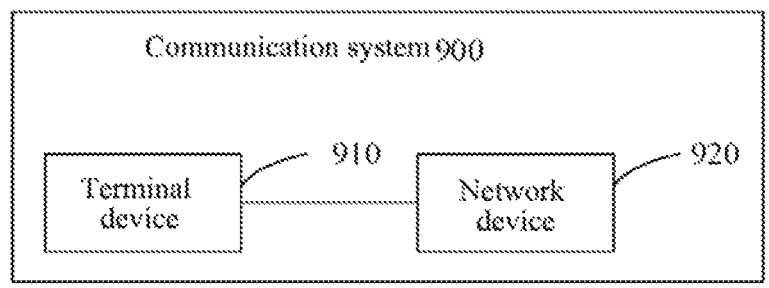
FIG. 12 is a schematic block diagram of a communication system according to an embodiment of the present application.

FIG. 12 is a schematic block diagram of a communication system 900 according to an embodiment of the present application. As shown in FIG. 12, the communication system 900 includes a terminal device 910 and a network device 920.

The terminal device 910 may be used to implement the corresponding functions implemented by the terminal device in the foregoing methods, and the network device 920 may be used to implement the corresponding functions implemented by the network device in the foregoing methods. For brevity, details are not described herein again.

It should be understood that the processor in an embodiment of the present application may be an integrated circuit chip with signal processing capability. In an implementation process, each step of the foregoing method embodiments may be completed by an integrated logic circuit of hardware in a processor or instructions in a form of software. The above processor may be a general-purpose processor, a digital signal processor (DSP), an application specific integrated circuit (ASIC), a field programmable gate array (FPGA), or other programming logic devices, discrete gates or transistor logic devices, discrete hardware components. Various methods, steps, and logical block diagrams disclosed in the embodiments of the present application may be implemented or executed. A general-purpose processor may be a microprocessor or the processor may be any conventional processor or the like. The steps in combination with the methods disclosed in the embodiments of the present application may be directly embodied by a hardware decoding processor, or may be performed by a combination of hardware and software modules in the decoding processor. The software module can be located in a conventional storage medium in the art such as random access memory, flash memory, read-only memory, programmable read-only memory, or electrically erasable programmable memory, register, or the like. The storage medium is located in the memory, and the processor reads information in the memory and combines its hardware to complete the steps of the above methods.

It can be understood that the memory in the embodiments of the present application may be a volatile memory or a non-volatile memory, or may include both volatile and non-volatile memory. Where, the non-volatile memory may be a read-only memory (ROM), a programmable ROM (PROM), an erasable PROM (EPROM), an electrically EPROM (EEPROM) or flash memory. The volatile memory may be a random access memory (RAM), which is used as an external cache. By way of example but not limitation, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct rambus RAM (DR RAM). It should be noted that the memory of the systems and methods described herein is intended to include, but is not limited to, these and any other suitable types of memory.

It should be understood that the foregoing memory is exemplary but not limitation. For example, the memory in the embodiments of the present application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM) and direct rambus RAM (DR RAM), or the like. That is, the memories in the embodiments of the present application are intended to include, but not limited to, these and any other suitable types of memories.

An embodiment of the present application further provides a computer-readable storage medium for storing computer programs.

In an embodiment, the computer-readable storage medium can be applied to the network device in the embodiments of the present application, and the computer programs cause a computer to execute the corresponding process implemented by the network device in various methods in the embodiments of the present application. For brevity, details are not described herein again.

In an embodiment, the computer-readable storage medium can be applied to the terminal device in the embodiments of the present application, and the computer programs cause a computer to execute the corresponding process implemented by the mobile terminal/terminal device in various methods in the embodiments of the present application. For brevity, details are not described herein again.

An embodiment of the present application further provides a computer program product, including computer program instructions.

In an embodiment, the computer program product can be applied to the network device in the embodiments of the present application, and the computer program instructions cause a computer to execute the corresponding process implemented by the network device in various methods in the embodiments of the present application. For brevity, details are not described herein again.

In an embodiment, the computer program product can be applied to the terminal device in the embodiments of the present application, and the computer program instructions cause a computer to execute the corresponding process implemented by the mobile terminal/terminal device in various methods in the embodiments of the present application. For brevity, details are not described herein again.

An embodiment of the present application also provides a computer program.

In an embodiment, the computer program may be applied to the network device in the embodiments of the present application. When the computer program is run on a computer, the computer is caused to execute the corresponding process implemented by the network device in various methods in the embodiments of the present application. For brevity, details are not described herein again.

In an embodiment, the computer program may be applied to the terminal device in the embodiments of the present application. When the computer program is run on a computer, the computer is caused to execute the corresponding process implemented by the terminal device in various methods in the embodiments of the present application. For brevity, details are not described herein again.

Those of ordinary skill in the art may appreciate that the units and algorithm steps of the various examples described in combination with the embodiments disclosed herein can be implemented by electronic hardware, or a combination of computer software and electronic hardware. Whether these functions are performed in hardware or software depends on specific applications and design constraints of the technical solutions. A person skilled in the art can use different methods to implement the described functions for each specific application, but such implementation should not be considered to be beyond the scope of the present application.

A person skilled in the art can clearly understand that, for the convenience and brevity of description, the specific operation processes of the systems, devices, and units described above can refer to the corresponding processes in the foregoing method embodiments, details are not described herein again.

In the several embodiments provided in the present application, it should be understood that the disclosed systems, devices, and methods may be implemented in other ways. For example, the device embodiments described above are merely illustrative. For example, the division of the unit is only a logical function division. In an actual implementation, there may be another division manner. For example, multiple units or components may be combined or may be integrated into another system, or some features can be ignored or not executed. In addition, the shown or discussed coupling or direct coupling or communication connection between each other may be an indirect coupling or communication connection through some interfaces, devices or units, and may be in electrical, mechanical or other forms.

The units described as separate components may or may not be physically separated, and the components displayed as units may or may not be physical units, that is, may be located in one place, or may be distributed to multiple network units. Some or all of the units may be selected according to actual needs to implement the purpose of the solution of the present embodiment.

In addition, each functional unit in each embodiment of the present application may be integrated into one processing unit, or each unit may exist physically separately, or two or more units may be integrated into one unit.

This functionality, if implemented as a software functional unit and sold or used as a standalone product, can be stored in a computer readable storage medium. Based on such understanding, the technical solution of the present application essentially, or a part of contributing to the prior art, or a part of the technical solution, may be embodied in a form of a software product, the computer software product is stored in a storage medium, which includes a number of instructions for causing a computer device (which may be a personal computer, server, or network device, or the like) to perform all or part of the steps of various embodiments of the present application. The foregoing storage medium includes various medium that can store program codes: a U disk, a mobile hard disk, a read-only memory (ROM), a random access memory (RAM), a magnetic disk, or an optical disk, or the like.

The above mentioned are only specific implementations of the present application, but the protection scope of the present application is not limited thereto. Any person skilled in the art can easily think of changes or substitutions within the technical scope disclosed in the present application, which should be covered in the protection scope of the present application. Therefore, the protection scope of the present application should be determined by the protection scope of the claims.

What is claimed is:

1. A signal transmission method, comprising:
   sending, by a network device when a terminal device is configured with multiple Bandwidth Parts (BWPs), configuration information of each BWP of the multiple BWPs to the terminal device,
   wherein the configuration information of each BWP is used to configure a power saving signal corresponding to the BWP;
   wherein configuration information of the power saving signal corresponding to each BWP is carried in the configuration information of the corresponding BWP;
   wherein frequency domain resources of the power saving signal corresponding to each BWP are located inside a bandwidth range of the BWP; and
   wherein the method further comprises:
      sending, by the network device when a second BWP of the multiple BWPs is in an activated state, a power saving signal corresponding to the second BWP to the terminal device according to configuration information of the power saving signal corresponding to the second BWP.

2. The method according to claim 1, wherein the power saving signal corresponding to the second BWP corresponds to at least one window on the second BWP, the at least one window comprises a Discontinuous Reception (DRX) sending window, a Paging Occasion (PO) or a Physical Downlink Control Channel (PDCCH) search space.

3. A signal transmission method, comprising:
   receiving, by a terminal device when the terminal device is configured with multiple Bandwidth Parts (BWPs), configuration information of each BWP of the multiple BWPs sent by a network device,
   wherein the configuration information of each BWP is used to configure a power saving signal corresponding to the BWP;
   wherein configuration information of the power saving signal corresponding to each BWP is carried in the configuration information of the corresponding BWP;
   wherein frequency domain resources of the power saving signal corresponding to each BWP are located inside a bandwidth range of the BWP; and
   wherein the method further comprises:
      receiving by the terminal device when a second BWP of the multiple BWPs is in an activated state, a power saving signal corresponding to the second BWP sent by the network device according to configuration information of the power saving signal corresponding to the second BWP.

4. The method according to claim 3, wherein the method further comprises:
   determining, by the terminal device, that Physical Downlink Control Channel (PDCCH) detection is performed in at least one window on the second BWP according to the power saving signal corresponding to the second BWP, or
   determining, by the terminal device, that Physical Downlink Control Channel (PDCCH) detection is not performed in at least one window on the second BWP according to the power saving signal corresponding to the second BWP.

5. The method according to claim 4, wherein the at least one window comprises a Discontinuous Reception (DRX) sending window, a Paging Occasion (PO) or a PDCCH search space.

6. A network device, wherein the network device comprises:
   a processor and a memory, wherein the memory is configured to store a computer program, the processor is configured to invoke and run the computer program stored in the memory, and implement the following step:
   sending, when a terminal device is configured with multiple Bandwidth Parts (BWPs), configuration information of each BWP of the multiple BWPs to the terminal device,
   wherein the configuration information of each BWP is used to configure a power saving signal corresponding to the BWP;
   wherein configuration information of the power saving signal corresponding to each BWP is carried in the configuration information of the corresponding BWP;
   wherein frequency domain resources of the power saving signal corresponding to each BWP are located inside a bandwidth range of the BWP; and
   wherein the processor is further configured to invoke and run the computer program stored in the memory, and implement the following step:
      sending, when a second BWP of the multiple BWPs is in an activated state, a power saving signal corresponding to the second BWP to the terminal device according to configuration information of the power saving signal corresponding to the second BWP.

7. The network device according to claim 6, wherein the power saving signal corresponding to the second BWP corresponds to at least one window on the second BWP, and the at least one window comprises a Discontinuous Reception (DRX) sending window, a Paging Occasion (PO) or a Physical Downlink Control Channel (PDCCH) search space.

8. A terminal device, wherein the terminal device comprises:
   a processor and a memory, wherein the memory is configured to store a computer program, the processor is configured to invoke and run the computer program stored in the memory, and implement the following step:
   receiving, when the terminal device is configured with multiple Bandwidth Parts (BWPs), configuration information of each BWP of the multiple BWPs sent by a network device,
   wherein the configuration information of each BWP is used to configure a power saving signal corresponding to the BWP;
   wherein configuration information of the power saving signal corresponding to each BWP is carried in the configuration information of the corresponding BWP;
   wherein frequency domain resources of the power saving signal corresponding to each BWP are located inside a bandwidth range of the BWP; and
   wherein the processor is further configured to invoke and run the computer program stored in the memory, and implement the following step:
      receiving, when a second BWP of the multiple BWPs is in an activated state, a power saving signal corresponding to the second BWP sent by the network device according to configuration information of the power saving signal corresponding to the second BWP.

9. The terminal device according to claim 8, wherein the processor is further configured to invoke and run the computer program stored in the memory, and implement the following step:

determining that Physical Downlink Control Channel (PDCCH) detection is performed in at least one window on the second BWP according to the power saving signal corresponding to the second BWP, or determining that Physical Downlink Control Channel (PDCCH) detection is not performed in at least one window on the second BWP according to the power saving signal corresponding to the second BWP.

10. The terminal device according to claim 9, wherein the at least one window comprises a Discontinuous Reception (DRX) sending window, a Paging Occasion (PO) or a PDCCH search space.

\* \* \* \* \*